(No Model.)
H. TUDOR.
ELECTRODE FOR STORAGE BATTERIES.
No. 478,661. Patented July 12, 1892.
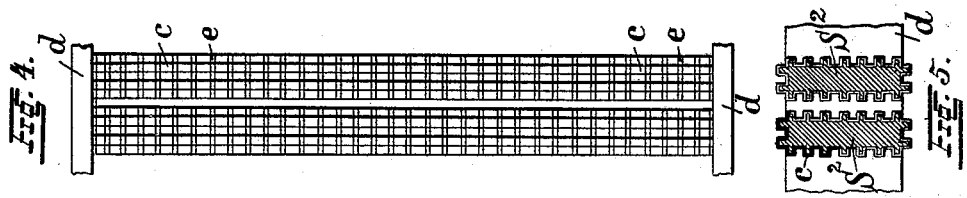
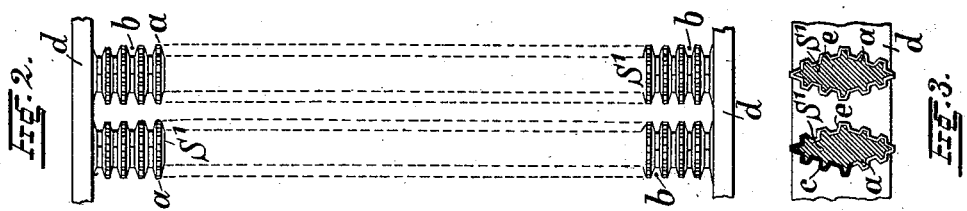
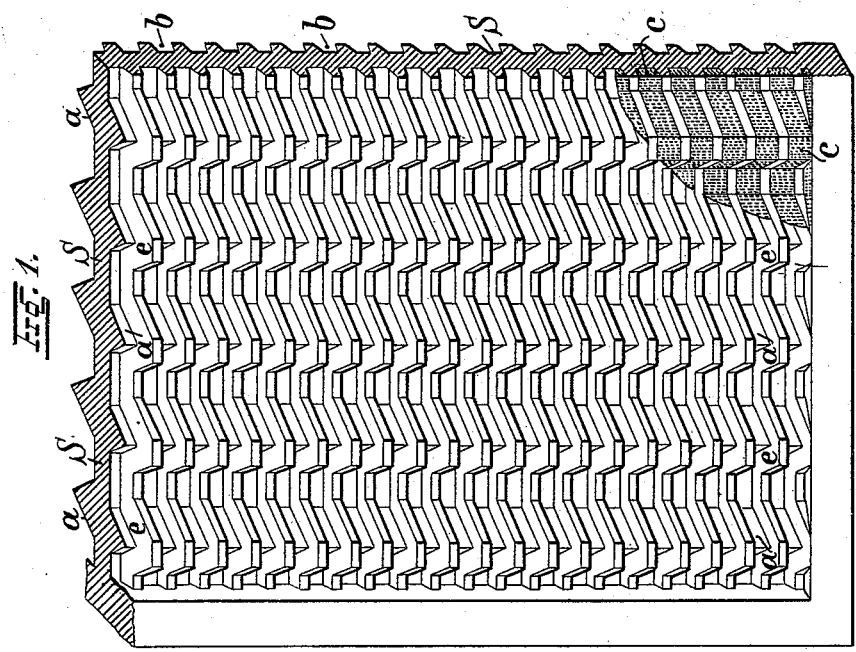
Attest:
Thos. F. Kehoe
G. M. Borst
Inventor:
Henri Tudor,
by
Philipp Munson Phelps
Attorneys.

UNITED STATES PATENT OFFICE.

HENRI TUDOR, OF ROSPORT, LUXEMBURG.

ELECTRODE FOR STORAGE-BATTERIES.

SPECIFICATION forming part of Letters Patent No. 478,661, dated July 12, 1892.

Application filed January 8, 1892. Serial No. 417,402. (No model.) Patented in Belgium May 30, 1891, No. 94,869.

*To all whom it may concern:*

Be it known that I, HENRI TUDOR, a subject of the Grand Duke of Luxemburg, residing at Rosport in the Grand Duchy of Luxemburg, have invented a new and useful Improvement in Electrodes for Storage-Batteries, (for which I have received Letters Patent in Belgium, dated May 30, 1891, No. 94,869,) whereof the following is a specification.

My invention relates to electrodes for electric storage-batteries, consisting in a metallic core and a substance which, by undergoing certain chemical changes, operates as the electricity-accumulating agent; and the object of the improvement is to augment the active surface of the electrodes and thereby to increase their capacity of accumulating electricity as compared with that of electrodes of like size at present in use or to allow of reducing the number of electrodes in a battery of given capacity. For this purpose I construct the core of the electrode with ribs, to be called "main" ribs, which in turn have secondary ribs that may be parallel or transverse to the main ribs and form between them grooves. Into these grooves I pack or embed the operative substance. I thus obtain an electrode the efficient surface whereof is corrugated or zigzag-shaped, and consequently considerably larger than the plane surface inclosed within its outline. The said core may consist either in a single body or in a number of combined bodies, and the ribs thereof may be of any suitable form.

In the annexed drawings, Figure 1 is a perspective view of a portion of an electrode carried out according to my invention and consisting in a single body, some of the grooves being shown filled with operative substance. Fig. 2 shows in elevation a portion of the core of an electrode composed of a number of bars, while Fig. 3 is a sectional plan corresponding thereto. Figs. 4 and 5 represent a modification of the latter arrangement in views alike to Figs. 2 and 3, except that in Fig. 4 the electrode is shown filled with operative substance.

The core of the electrode represented by Fig. 1 consists in the plate S, having the vertical main ribs $a$, provided with the transverse secondary ribs $e$, forming between them the grooves $b$. Into these grooves is embedded the substance $c$, constituting the operative agent of the electrode, the outer surface of the said substance being made flush with the secondary ribs. The breadth of the effective surface of the electrode is thus rendered equal to the outline of the aggregate secondary ribs.

According to Figs. 2 and 3 the core of the electrode is composed of bars $S'$, being in section of lozenge shape and having each the main ribs $a$, with the secondary ribs $e$, forming the grooves $b$ for the reception of the operative substance $c$, Fig. 3. The said bars $S'$ are conductively connected together at their ends or formed integral with the bars $d$.

The arrangement shown by Figs. 4 and 5 differs from the latter only in this that the bars $S^2$ have rectangular sectional shape and that the main ribs are of rectangular section, also, while, according to Figs. 1 and 3, the main ribs taper from their base outward.

In addition to what has been stated above, these electrodes present the advantage that the surfaces of the positive and the negative electrodes may be brought in such proportion to each other that the quantity of gas evolved in charging the battery is reduced to the smallest possible amount.

The described electrode cores may be manufactured by casting, pressing, or rolling.

I claim as my invention—

An electrode for electric storage-batteries, consisting of a core composed of one or more bodies of metal having main ribs $a$, which are provided with secondary ribs $e$, forming between them grooves $b$, and operative substance embedded in the said grooves, substantially as described.

In testimony whereof I have hereunto set my hand in the presence of two subscribing witnesses.

HENRI TUDOR.

Witnesses:
A. VAN DEN RUCKHORST,
GREGORY PHELAN.